May 30, 1944.  L. V. WHISTLER ET AL  2,350,004
PUNCH AND DIE MECHANISM FOR FORMING KNOCK-OUTS
Filed March 20, 1943  5 Sheets-Sheet 1
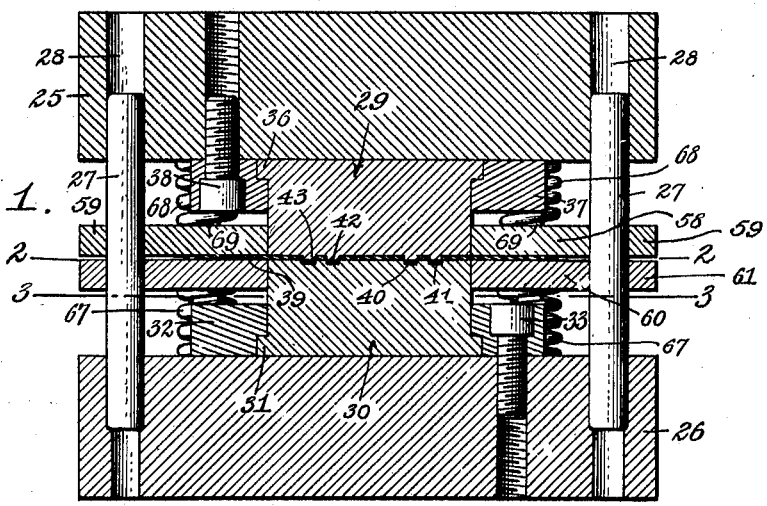
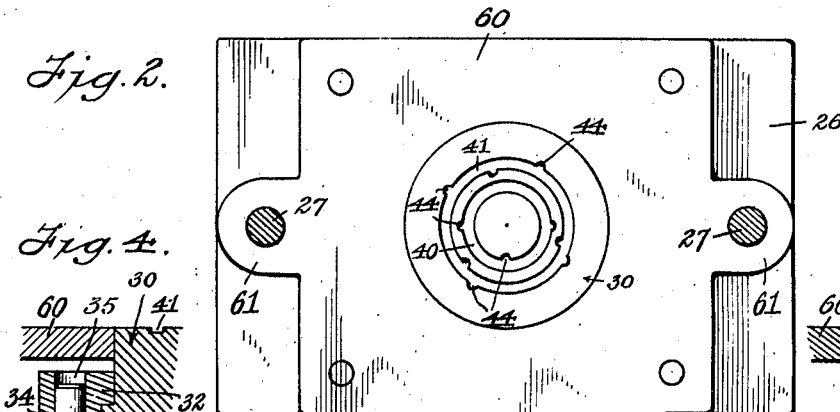
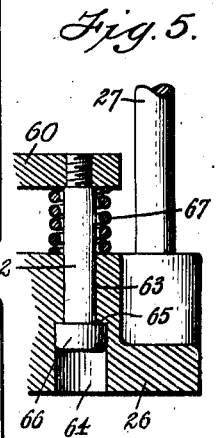
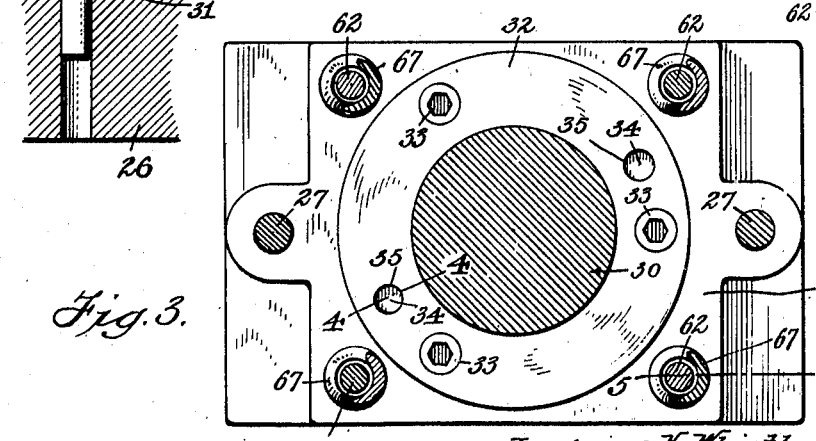
Lawrence V. Whistler
Sanford A. Whistler  Inventors.
By Emil Herbert  Attorney.

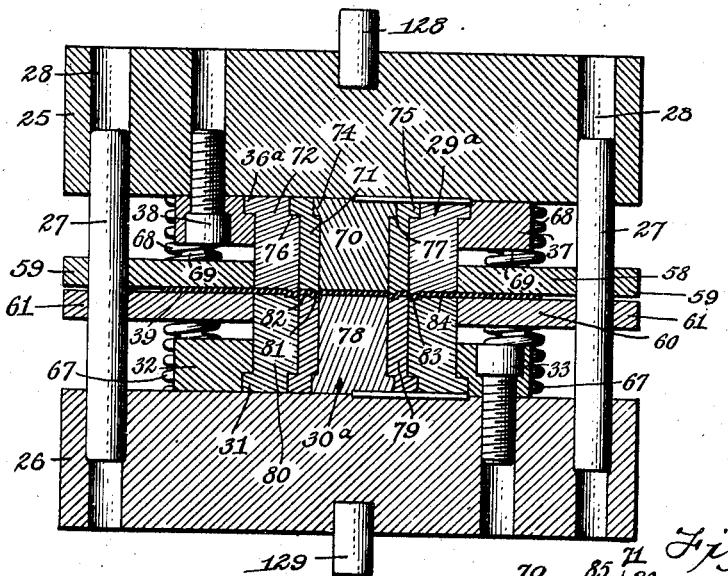
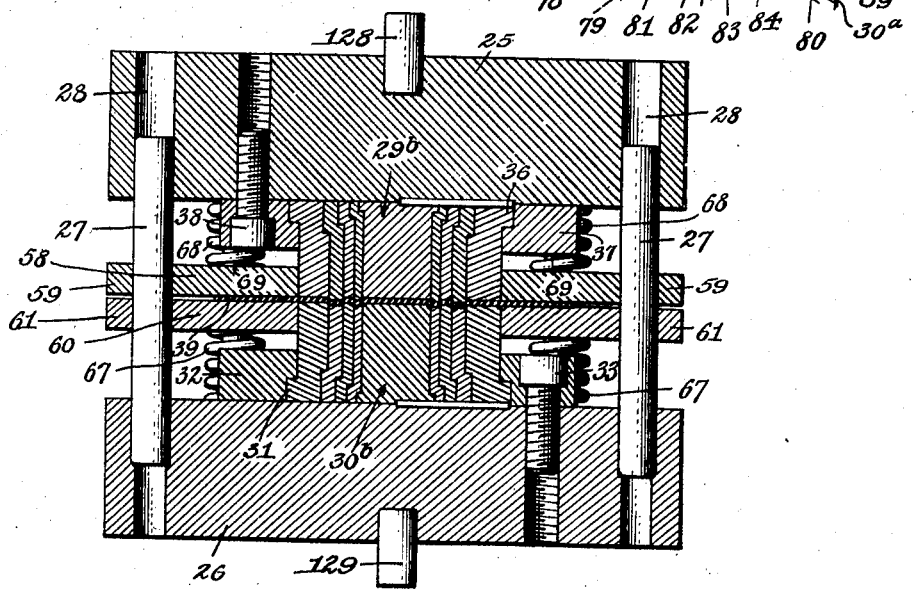

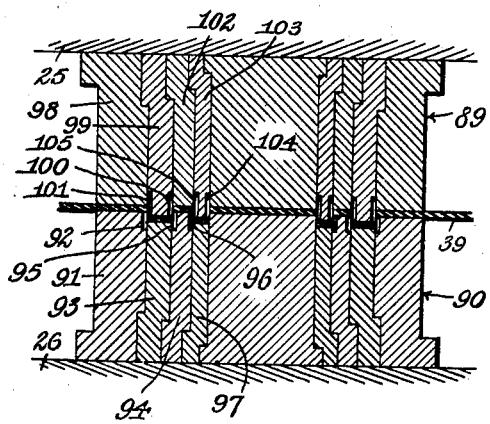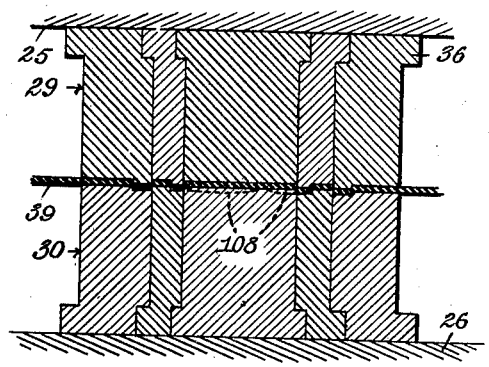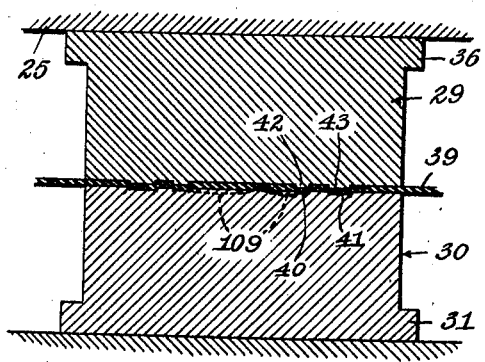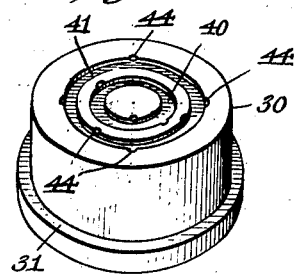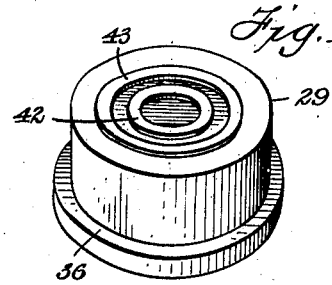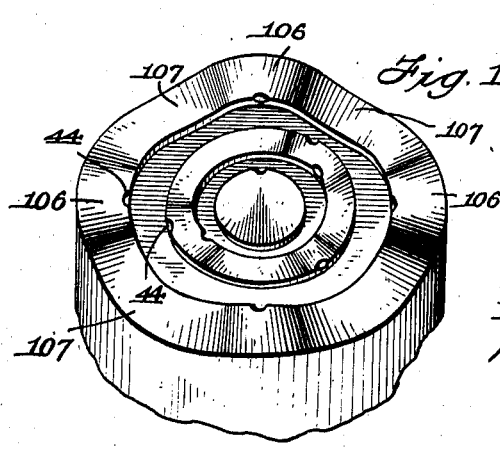

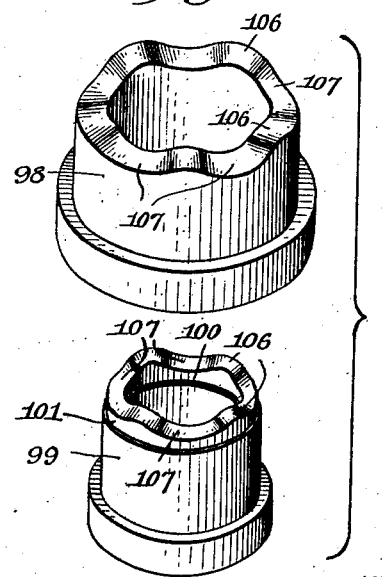
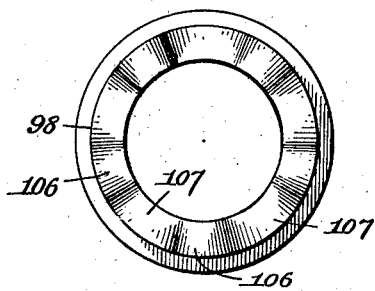
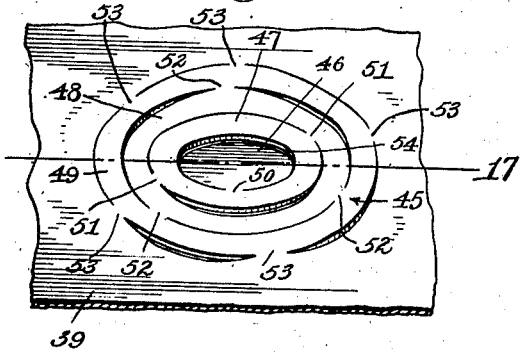
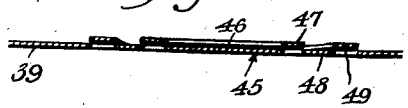
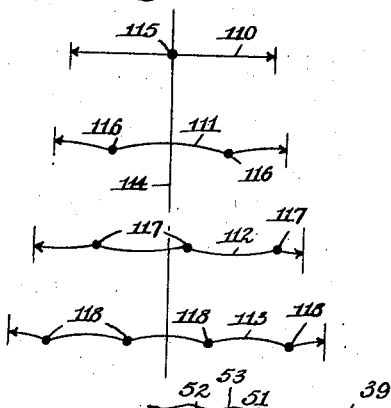
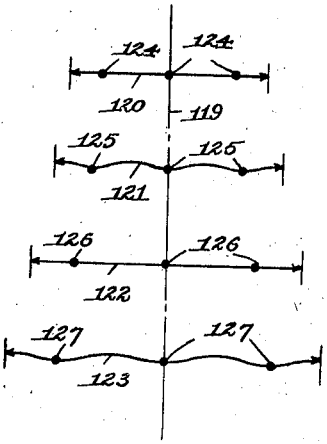
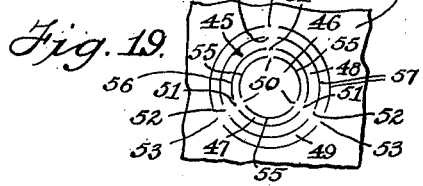

May 30, 1944. L. V. WHISTLER ET AL 2,350,004
PUNCH AND DIE MECHANISM FOR FORMING KNOCK-OUTS
Filed March 20, 1943 5 Sheets-Sheet 5
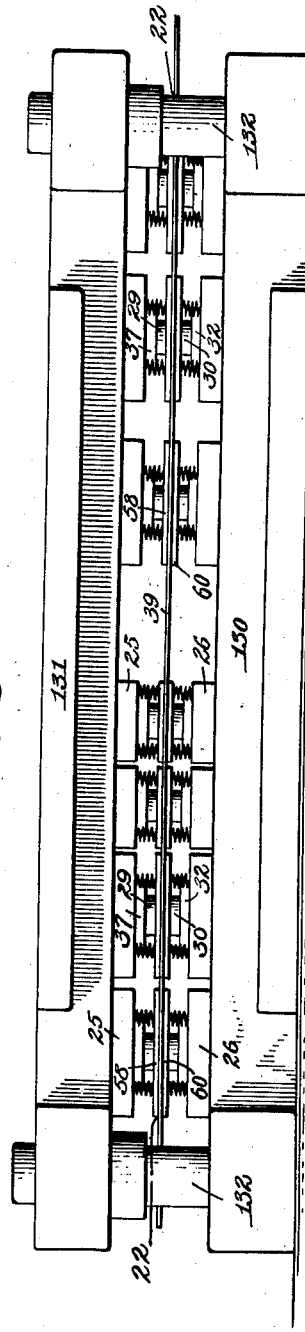
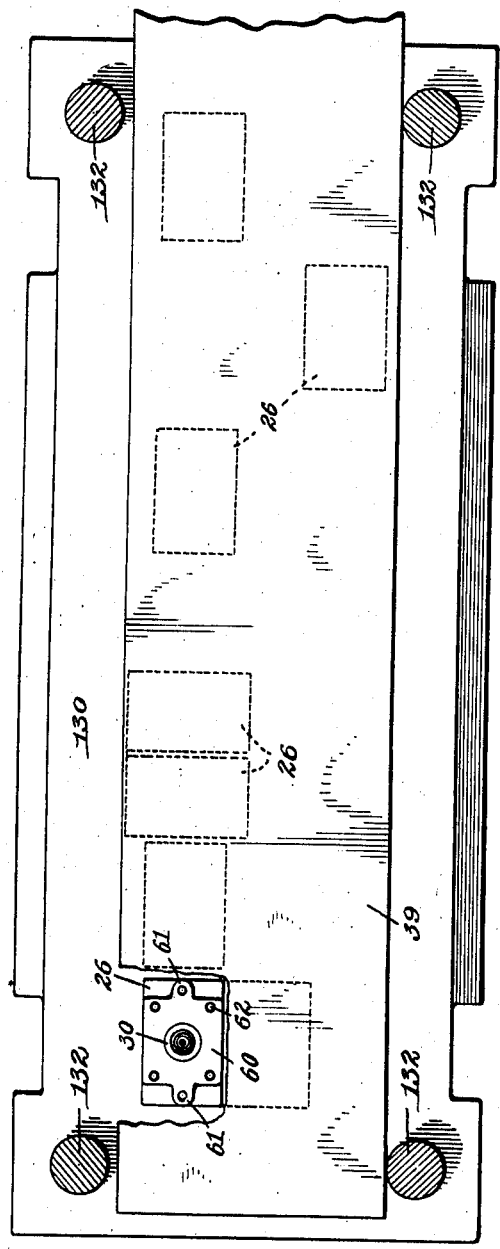
Lawrence V. Whistler
Sanford A. Whistler
Inventors.
By Emil Newhart
Attorney.

Patented May 30, 1944

2,350,004

UNITED STATES PATENT OFFICE 2,350,004

PUNCH AND DIE MECHANISM FOR FORMING KNOCKOUTS

Lawrence V. Whistler and Sanford A. Whistler, Kenmore, N. Y.

Application March 20, 1943, Serial No. 479,953

22 Claims. (Cl. 164—32)

This invention relates to means for shearing "knock-outs" in containers or in material from which containers are constructed—containers such as junction boxes or similar objects adapted to house electrical instrumentalities and having tubes or conduits connected thereto through which electrical circuit-wires are passed for connection to the electrical instrumentalities, and it relates more particularly to means for shearing knock-outs consisting of a plurality or series of knock-out elements or sections, one surrounding or practically surrounding another and having such elements or sections almost entirely severed one from another and all from the container, box, or other object in which the knock-out or knock-outs are formed; the plurality or series of knock-out elements or sections being rudimentarily formed in a single stamping or shearing operation and being designed to be selectively removed from the wall of the container or other object in which the knock-out is formed, so that a conduit-opening will be provided conforming in diameter to that of the conduit to be used with the container, box, or other object in which the knock-out is formed.

Such knock-outs are not new with applicants and provision has heretobefore been made for stamping or pressing a plurality or series of knock-out elements or sections in containers, boxes, and similar objects so as to permit one or more of such elements or sections to be forced from the object or part in which they are formed, depending on the size of the opening to be provided for reception of the conduit to be used; but all types of punch and die equipment heretofore used for such purposes have been expensive to produce, complicated in construction and of a size to occupy considerable space, one of which may be referred to as Patent No. 2,240,187 thereby making it impossible to economically meet present-day requirements, which call for closely-spaced knock-outs in many of the larger containers or boxes housing electrical instrumentalities, without stamping or pressing each individual knock-out separately.

It is one of the objects of our invention to provide means in the form of a punch and die device that will occupy comparatively little space and which therefore can be used in battery form, with such devices set up in a press or die-set in closely-spaced relation so as to enable many knock-outs, even though in close proximity to each other, to be stamped or pressed in a container, box, or other object, in one operation.

Another object of our invention is to provide a simple and efficient punch and die mechanism which will be inexpensive and the parts of which can be easily and quickly machined and assembled for use.

Another object of our invention is to provide a punch and die-device or mechanism for stamping or pressing a knock-out in a wall of a box or other object, consisting of a plurality of elements or sections of different circumferential measurement integral with such wall or other object, yet severed therefrom except for small or narrow tie-regions whereby integral connection is maintained between the elements or sections and between the larger or largest element or section and the wall or other object in which said knock-out elements or sections are formed, and wherein the punch and the die are each formed from a single piece of steel or other suitable material.

Still another object of our invention is to provide a punch and die-device for the purpose mentioned, in which the punch member and the die member are each formed of one integral piece of material and the operating faces thereof are each provided with an annular depression or depressions and an annular elevated portion or portions, said annular elevated portion or portions of each member being driven into the annular depression or depressions, as the case may be, of the co-acting member, and the elevated portion or portions of each said punch member or said die member having means at segregated points to prevent the shearing or lancing of the stock placed between the punch and die.

Other objects of our invention will be described hereinafter, and from the various embodiments of the invention illustrated in the accompanying drawings and the description to follow will be apparent to those skilled in the art to which this invention relates.

The invention consists in the construction, arrangement, and combination of parts, herein specified, all as more particularly pointed out in the subjoined claims.

In the drawings—

Fig. 1 is a central vertical section through a knock-out punch and die-mechanism, showing the preferred construction of our invention.

Fig. 2 is a horizontal section taken on line 2—2, Fig. 1; the stock shown stamped in Fig. 1 being omitted to show the die-member of the mechanism in plan view.

Fig. 3 is a horizontal section taken on line 3—3, Fig. 1.

Fig. 4 is a vertical section taken on line 4—4, Fig. 3.

Fig. 5 is a vertical section taken on line 5—5, Fig. 3.

Fig. 6 is a central vertical section through a die-mechanism constructed in accordance with our invention and embodying a somewhat modified construction.

Fig. 6ª is an enlarged section through a portion of the two die-members shown in Fig. 6.

Fig. 7 is a similar section showing a further modified construction of our invention.

Fig. 8 is a central vertical section through co-operating forming-members, such as used to bulge portions of the sheared or lanced sections of a knock-out to assure complete separation along the sheared or lanced lines.

Figs. 9 and 10 are similar sections of additional modifications of the co-operating die-members falling within the scope of our invention, whereby the shearing or lancing and the bulging of parts of the knock-out are effected in one operation.

Fig. 11 is a perspective view of the die-member in its preferred form.

Fig. 12 is an inverted perspective view of the punch-member, shown in its preferred form.

Fig. 13 is a view of a die-member in which the stock-contacting or pressure-faces are unevenly formed or made undulating so that the stock operated upon will be sheared or lanced and certain portions of the sheared or lanced parts be bulged out of line with the stock in which the knock-out is being formed.

Fig. 14 is a perspective view of two parts of a die-member used to bulge knock-out portions, one part being adapted to be inserted in the other and the stock-contacting or pressure-faces thereof being made undulating.

Fig. 15 is an edge view of the upper part shown in Fig. 14.

Fig. 16 is a broken perspective view of a portion of a sheet of metal showing the knock-out as rudimentarily formed therein, with knock-out portions flexed or bulged upwardly or downwardly to position said portions out of alinement with the true or normal surface of the sheet of metal in which the knock-out is rudimentarily formed.

Fig. 17 is a section taken on line 17—17, Fig. 16.

Fig. 18 is a diagrammatic view or chart indicating the usual tie-portions of a knock-out and the flexed or bulged portions thereof extending from the tie-portion or from tie-portion to tie-portion.

Fig. 19 is a plan view of a portion of a sheet of metal in which a knock-out is formed, showing an arrangement of tie-portions other than that shown in Fig. 16 for retaining the several knock-out sections in place.

Fig. 20 is a diagrammatic view or chart indicating the tie-portions shown in Fig. 19 and curved or bulged portions between tie-portions.

Fig. 21 is a front view of a die-set, showing a plurality of knock-out making or die devices located therein.

Fig. 22 is a horizontal section taken on line 22—22, Fig. 21, the lower member of only one of the knock-out making or die devices shown in Fig. 21 being shown, the location of the remain-knock-out making or die devices shown in Fig. 21 being shown by dotted lines.

Since it is the purpose of our invention to produce a simple and inexpensive knock-out device or mechanism which will occupy comparatively little space and enable knock-outs to be closely arranged in the wall of a box in which electrical instrumentalities are to be confined or in any similar wall structure or sheet of metal from which such structures are to be formed, we prefer to employ in a die-device or die-mechanism of this kind, two simple punch and die-members capable of lancing a sheet of metal circularly or otherwise, either as a single knock-out, or as a multiple knock-out formed of a plurality or series of sections selectively removable from the object in which the knock-out is formed so that an opening may be created in the object conforming to a conduit to be used in conjunction with the object, usually a box-like structure in which electrical instrumentalities are confined and to which circuit-wires are led which pass through the conduit inserted in the knock-out opening, or through conduits inserted in such openings, and fastened in any suitable manner to the object.

In association with the punch and die-members, other parts or assemblies are employed so that a complete die-device or die-mechanism, simple in construction and extremely compact, is created which is capable of being placed within a die-set used in a power press or capable of being placed directly within a power press.

We, therefore, provide a punch-holder 25 which is adapted to be fastened to the upper or ram-member of a die-set or to the ram of a punch or stamping press, and a die-holder 26 adapted to be fastened to the shoe of a die-set or to the bed of a press. These punch and die-holders are gauged or guided one to the other, in some instances temporarily, and for this purpose we have provided easily detachable guide-posts 27 fastened into the die-holder 26 with a snug fit or otherwise so as to extend upwardly therefrom and enter guide openings 28 in the punch-holder 25.

Fastened to the underside of the punch-holder is a punch-member 29 and fastened to the upper face of the die-holder is a die-member 30. These punch and die-members are co-axially arranged and in preferred form each is constructed of a single block or piece of steel or other suitable material, preferably of cylindrical formation, for the reason that the opening which will eventually be formed by forcing out the knock-out or a section or combination of sections thereof is invariably to receive a cylindrical conduit or tube, but it will be apparent that these punch and die-members may be given any other formation.

The under-face of the die-member 30 lies in contact with the upper side of the die-holder 26 and has a peripheral flange 31. The die-member 30 is surrounded by a retainer element 32 in the form of an annulus, rabbeted around its inner edge to receive the peripheral flange 31 of the die-member. This retainer element or annulus lies in firm contact with the flat upper side of the die-holder and it is secured to the latter by securing screws 33 passed through said retainer element or annulus and threaded into the die-holder. These securing screws are arranged at regular intervals around the retainer element or annulus 32, as clearly shown in Fig. 3, and preparatory to so fastening said retainer element or annulus in place, dowel pins 34 are employed to properly position the same. These dowel pins are positioned at diametrically opposite points, as clearly shown in Fig. 3; the lower portions thereof being driven into the die-holder 26, as best shown in Fig. 4, while the upper portions thereof extend above the upper face of the die-holder and enter openings 35 formed in the retainer-element or annulus 32.

The punch-member 29 lies in contact with the under face of the punch-holder 25 and it also has a peripheral flange 36 at its upper end which is engaged by a retainer-element or annulus 37 internally rabbeted to receive said flange and arranged to surround the punch-member. This retainer-element or annulus is provided with openings to receive dowel pins similar to those of the retainer element or annulus 32 associated with the die-member and it is fastened in place by securing screws 38.

The under side of the punch-member and the upper side of the die-member may be referred to as operating faces, and more particularly as contact or pressure faces designed to co-act upon a sheet of metal or the wall of a box or other object, designated by the numeral 39. The upper face of the die-member 30 is provided with one or more depressions or grooves, the number depending upon the particular knock-out to be formed in the metal, and while we have illustrated a knock-out comprising several sections or parts and means for forming such knock-out, it is, of course, understood that the punch and die-members may be constructed to form a knock-out of a single part without departing from the principle involved in this invention, or the particular features embodied therein.

As clearly shown in Figs. 1 and 2, the die-member 30 is formed with two concentric annular depressions or grooves 40 and 41 having the axis of the die-member as their axes. The punch-member is provided with two concentric annular ribs or elevations 42 and 43 which conform in shape and size to the annular depressions or grooves 40 and 41 of the die-member and are co-axial with the latter. Therefore, upon insertion of a sheet of metal or the wall of a box or other structure between the two members of the punch and die-device when separated, the closing movement of said members will cause portions of the metal or wall of the structure to be forced downwardly into the annular depressions or grooves 40, 41, creating a lancing or shearing of the metal, or stock as it may be termed, so that rings are lanced or partly sheared from the stock and four distinct parts or sections provided in the metal or stock for the knock-out. However, to prevent a complete separation of these parts or sections from each other and from the surrounding stock, suitable means are employed for maintaining a tie between the several parts or sections and between the outermost part or section and the stock. For this purpose the inner or the outer peripheral wall of each of the annular concentric depressions or grooves is nicked, as at 44, and at points where these nicks are formed, tie-portions are established in the knock-out between arcuately sheared or lanced portions. This is best shown in Figs. 16 and 19 wherein the stock, whether in the form of a sheet of metal to be constructed into a box or other structure, or in the form of a wall of a box or other structure, is stamped, sheared, or lanced to form a knock-out, considered as a whole and designated by the numeral 45. In these two figures the number of parts or sections constituting the complete knock-out conforms to the punch and die-device shown in Figs. 1 to 5; the knock-out comprising a solid part or section 46 and three annular parts or sections 47, 48, and 49 which surround one another and all three of which surround the solid center part or section 46 and are co-jointly connected therewith through the medium of a tie-portion or tie-portions 50; a single tie-portion being shown in Figs. 16 and three tie-portions in Fig. 19. The solid center part or section 46 therefore maintains direct connection with the annular part or section 47 immediately surrounding it. The latter section maintains connection with the annular section 48 surrounding it through the medium of tie-portions 51, two of which are shown in Fig. 16 and three in Fig. 19. The annular part or section 48 also maintains connection with the annular part or section 49 immediately surrounding it through the medium of tie-portions 52, three of which are shown in each of Figs. 16 and 19. The outermost annular part or section 49 of the knock-out also maintains connection with the surrounding metal or stock in which the knock-out is formed through the medium of tie-portions 53, five of which are shown in Fig. 16 and three in Fig. 19.

It will, therefore, be understood that the number of tie-portions provided between the several parts or sections of the knock-out and between the knock-out as a whole and the stock in which it is formed may be varied to meet the required conditions, or individual desire, and also that the lancing or shearing of the stock is effected between the tie-portions of each section, regardless of their spacing. Consequently, while the innermost part or section 46 of the knock-out is circular and may be separated almost entirely from surrounding parts or sections of the knock-out by a substantially circularly-lanced line 54, as shown in Fig. 16, it may, as a modification be separated by arcuately-lanced lines 55 extending between a plurality of tie-portions 50, shown in Fig. 19. The section immediately surrounding it is separated from its associated surrounding parts or sections by arcuately lanced lines 56, as shown in Figs. 16 and 19, and in all cases, the annular sections are lanced one from the other and from the stock in which the complete knock-out is formed by arcuately lanced lines 57; the arcuately-lanced lines 55, 56 and 57 extending from tie-portion to tie-portion.

It is, of course, understood that these tie-portions may be formed in various ways, common to the art. In some cases they are entirely unsheared or unlanced portions, while in other cases they may be narrow scored regions so as to weaken the stock, yet maintain the knock-out in place in the stock as a single section or as a sectional knock-out, serving as a closure for a future or a proposed opening, with sufficient resistance only to compel a distinct blow, or definite pressure, to be exerted thereagainst or against certain parts or sections thereof to assure separation of the knock-out, or selected parts or sections of the knock-out, from the metal wall or other object in which it is formed, as clearly shown in Figs. 16 and 19.

In sectional knock-outs of this type attempts are often made to drive out a definite section or sections with a view of providing an opening of the desired size, only to find that the strain applied to the section or sections to be driven out of the wall or other object in which the knock-out is formed, causes other sections to be driven out also or at least to be weakened or driven out of alinement with the object in which the knock-out is formed. It is the purpose of our invention to prevent the sections outside the sections to be driven out from being forced out with the latter, or from being driven out of alinement with the object in which the knock-out is formed, and for this purpose we have successively narrowed the tie-portions between sections, from the outer region of the knock-out to the inner, so that the tie-portions between the innermost section and the section immediately surrounding it will be the weakest and permit the innermost section to be driven out of the knock-out without effecting the tie-portions between said surrounding section and the tie-portions of the sections surrounding the latter, and this gradual inwardly weakening of the tie-portions, or outwardly strengthening as it may also be termed, assures a knock-out in which the innermost section or any number of sections can be selectively driven out of the knock-out, or all knock-out sections out of the object in which the knock-out is formed. This we accomplish by gradually widening the tie-portions between sections outwardly from the center section, as clearly shown in Fig. 19, or this may be accomplished by having the tie-portions of even width and scored to different depths, with the scoring increasing inwardly.

As shown in the drawings, provision is made for forming knock-outs adapted to receive conduits of any of four different sizes. Assuming a conduit conforming in diameter to the diameter of the solid center section 46 is to be used, force would only be applied to the center section, which is separated from the surrounding annular section 47 except for the tie-portion 50 in Fig. 16 or the similarly designated tie-portions in Fig. 19. The tie-portion or tie-portions 50 would become weakened under the force applied directly to the center section, yet the tie-portions holding the section 46 to the section 47 adjoining it would not be subjected to like force and would be retained in alinement with the stock or wall in which the knock-out is formed. The center section would, therefore, yield and form an opening of the desired size. If an opening of larger size is required, the force would be simultaneously applied to the combination of sections matching the diameter of the opening to be formed and by means of a hammer or other suitable instrument, driving force would be applied to force the desired combination of sections out of the knock-out, while retaining any other section or sections larger than that of the opening to be formed. Therefore, knock-outs of this type provide for selectively removing knock-out sections to conform to the size of the conduit to be used.

While in the act of shearing or lancing a knock-out from metal or other stock, the area or areas adjacent the sheared or lanced lines are invariably driven out of true alinement with the metal or stock operated upon, even though not properly lanced or sheared, depending of course on the nature of the material in which the knock-out is to be formed, and where this occurs the stock is subjected to normalizing or straightening pressure so as to bring the section or sections, as the case may be, into true alinement with the stock in which the knock-out is formed.

As clearly shown in Figs. 1 and 3, a stripping plate 58 surrounds the lower end of the punch-member 29 and it is provided at opposite ends with guide ears 59 having openings therein to fit the guide-posts 27. A like stripping-plate 60 surrounds the upper end of the die-member 30 and it also has guide-ears 61 provided with openings to receive the guide-posts 27. These stripping plates are therefore guided for movement on the punch and die-members and also on the guide-posts 23. These guide-posts provide a simple means to position the two members of the punch and die-device in axial alinement before employing the securing means to be presently described for so maintaining them.

The guide-posts 27 may be retained in their supported positions when a single knock-out is to be formed in a sheet or when extremely wide sheets are to have knock-outs formed therein. While the guide-posts maintain the two members of the punch and die-device in concentric or axial relation, we have provided other means auxiliary thereto, as will be described hereinafter, which will at times be employed without the use of the guide-posts.

The stripping-plate 60 has guide-rods 62 fastened to its four corners and these extend downwardly and are entered in guide-holes 63 formed in the die-holder 26. The lower end of these guide-holes are enlarged, as at 64, Fig. 5, to provide downwardly-facing shoulders 65, against which enlargements or heads 66 at the lower ends of said guide-rods normally bear. Surrounding each of these guide-rods is a spiral spring 67, one end of which bears against the upperside of the die-holder 26, as best shown in Fig. 5. Similar springs 68 are provided between the stripping-plate 58 and the punch-holder 25 and these are associated with guide-rods 69 similar to and operating in the same manner as the guide-rods 62. The guide-rods associated with the springs 68 enter holes (not shown) in the punch-holder, exactly like the guide-holes 63 in the die-holder 26. The springs 67 and 68 function to position the lower face of the punch stripping plate 58 somewhat below the lower or operating face of the punch-member 29, while the stripping plate 60 has its upper face somewhat above the level of the upper or operating face of the die-member 30 so that when the punch and die-members are brought together and are under full pressure against the stock, the stripping-plates may be in alinement with the true or operating faces of the punch and die-members, and on separating these members, the stripping-springs 67 and 68 will retrieve their normal positions and act to strip the stock from the punch and die-members. This adjustment may of course be modified, so long as the stripping-plates function to strip the stock from the punch and die-members. When the stripping-plates are in normal positions, the heads of the guide rods 62 and 69 will be in firm contact with the shoulders, such as 65, in their respective guide holes.

While we prefer making the punch and die-members cylindrical, it is apparent that the exterior formation of these members may be otherwise and yet permit the annular depressions and elevations of the two members of the punch and die-couple to be formed in or on the contacting pressure or operating faces of the same. It is also to be understood that the several parts or sections of the knock-out need not necessarily be concentric, since variously sized openings may be provided for in a knock-out without restricting ourselves to the concentric arrangement of the parts or sections of the knock-out particularly described herein.

While a die-device having an integral die-member and an integral punch-member is our preferred construction, we have also resorted to the use of a sectional punch-member and a sectional die-member, in which the sections are nested one within the other. Therefore, in Fig. 6 we have illustrated a punch-member 29a comprising three sections, one a solid cylindrical center or core section 70 and the others annular or sleeve-like cylindrical sections 71 and 72, one annular or cylindrical section surrounding the other and both surrounding the center or core member 70. The outermost sleeve-like section 72 is provided at its upper end with an outstanding or peripheral flange 36a which is entered into the rabbeted portion of the retainer-element or annulus 37 surrounding it. At the upper end of the inner sleeve-like section and of the center or core section, alining flanges 74 and 75 are formed. The inner peripheral face at the upper end of the outermost sleeve-like section 72 is rabbeted or counterbored, as at 76 to receive the alining flange 75 of the inner sleeve-like section 17 and the upper end of the latter has its inner peripheral face rabbeted or counterbored, as at 77, to receive the alining flange 74 of the center or core section 70 of the punch-member.

The co-operating die-member is similarly constructed and designated by the numeral 30ᵃ. It also has a cylindrical center or core section 78 and annular or cylindrical sleeve-like sections 79 and 80, one of which latter surrounds the other and both of which surround the center or core section. The outer sleeve-like section of the die-member is provided with means similar to that of the punch-member for engagement with its co-acting retainer-element or annulus 32 and all sections of said die-member have means similar to those of the punch-member for alining the sections with respect to each other.

It may here be stated that the alining means of these sections, comprising the alining flanges and their co-operating rabbets or counterbores, are for the purpose of alining the operating or pressure faces of the several sections of the punch-member and of the die-member in their true-co-operating relation so that they will act against the stock in exactly the same manner as the integral construction of punch-member and die-member herein previously described. In the particular modification shown in Fig. 6 each of the annular or sleeve-like sections of the punch-member and die-member has a stepped or off-set operating edge or surface, while the center or core-member has an even or unbroken surface; this being best shown in Fig. 6ᵃ.

By stepping the inner annular or sleeve-like section 79 of the die-member, an annular depressed region 81 is formed around substantially the inner half of its edge, thus providing an annular elevated region 82 along the outer half of said edge which is in true alinement with the upper surface of the center or core section 78 of the die-member. The operating edge of the outer sleeve-like section 80 is also provided with an annular depressed region 83 around its inner portion which is on the same level as the annular depressed region 81 of the inner sleeve-like section, while the portion of the outer sleeve-like section surrounding said annular depressed region 83 is elevated, as at 84, and on the same level as the outer annular elevated region 82 of the inner sleeve-like section and the upper or operating face of the center or core-section 78.

The edges or operating faces of the several sections of the punch-member 29ᵃ are conversely formed so that the inner annular or sleeve-like section 71 has an annular elevated region 85 around the inner portion of its edge which is in vertical alinement with the annular depressed region 81 of the co-acting inner sleeve-like section 79 of the die-member and is adapted to enter the same and an annular depressed region 86 matching the annular elevated portion 82 of said section 79. The edge or operating face of the outer sleeve-like section 72 of the punch member has around its inner portion an annular elevated region 87 which is in vertical alinement with and matches the depressed region 83 of the corresponding section of the die-member, and it also has an annular depressed region 88 at its edge around its outer portion which matches the annular elevated region 84 of said section 80. Therefore, like the integral punch-member and die-member previously described, the upper face of the complete sectional die-member has a central elevated portion, an adjacent annular depression separated from a second surrounding annular depression by an annular elevated portion, all in concentric alinement with matching portions in and on the operating face of the punch-member, so that a knock-out can be formed therewith having the center section or part 46, and the annular sections or parts 47, 48, and 49, shown in Fig. 16.

It is to be understood that provision is made in each shearing or lancing punch and di-structure herein described, regardless of its modification, similar to the provision made in the preferred construction shown in Figs. 1 to 5, for the purpose of establishing tie-portions, such as 50 to 53, which permit of detaching any number of the several parts or sections of the knock-out, depending on the size of the opening required.

In the modification shown in Fig. 7 we have also shown a sectional punch-member and a sectional die-member, while in Fig. 6 we have shown a punch and die-device or mechanism in which the punch-member and the die-member each embody three sections for producing a four-section knock-out. In Fig. 7 the device for producing a four-section knock-out is shown as comprising punch and die-members so constructed that each comprises five parts or sections. In this instance the punch-member designated 29ᵇ and the die-member, designated 30ᵇ, each comprises a solid center or core-section like those described in Fig. 6 and annular or cylindrical sleeve-like sections like those shown in Fig. 6, one annular or sleeve-like section surrounding another and all surrounding the solid center or core-section. The outermost sleeve-like member of each of the punch and die-members is provided with a peripheral or outstanding retainer-flange like those of the outer-most sections shown in Fig. 6, which engages the rabbeted internal diameter of the retainer-element or annulus 32 or 37, as the case may be. The upper or inner ends of the several remaining sections of the punch-member and the lower or inner ends of matching sections of the die-member are provided with alining flanges fitting corresponding counterbores or rabbets in the sections immediately surrounding them, in the same manner as the sections shown in Fig. 6. Like the alining flanges in the construction shown in Fig. 6, these are to maintain the operating faces or edges of the several sections of the punch-member and of the die-member in their proper relation to each other. In this modification, each pair of co-acting sections, excepting the outer-most pair, serve to form a section of the knock-out while the outer-most sleeve-like sections act upon the stock surrounding the knock-out. Therefore, the dividing lines between all sections of each of the punch and die-members, in this modification, will serve as shearing or lancing edges, except where the usual tie-forming nicks are provided, such as 44 shown in the preferred construction.

In knock-outs of the kind shown and described, the shearing or lancing operation of the metal is oftentimes incomplete, due to the fact that at regions other than the small tie-portions which are intended to serve as the sole means for tying such sections together, a complete severance of the metal does not always take place. Consequently, users of products in which knock-outs are called for demand that a complete severance of the metal be effected between the tie-portions and with this object in view we have provided means for off-setting or bulging the metal between the tie-portions connecting the sections of the knock-out together. This may be accomplished while shearing or lancing the metal, or after having sheared or lanced the metal to define the outlines of the several sections of the knock-out.

The members of the punch and die device or mechanism thus far described are employed solely for shearing or lancing the metal between sections of the knock-out and while such shearing and lancing operation forces portions of the metal somewhat out of line with adjacent portions, a complete severance of the metal along the sheared or lanced lines can not be assured at all times, particularly with certain kinds of metal. We have, therefore, provided what may be termed forming, off-setting or bulging dies, with which knock-outs previously stamped, sheared, or lanced are operated upon so as to bulge or offset adjoining areas or sections of the knock-out out of complete alinement between the tie-portions connecting the sections so that light can be seen along the major portions of the circularly or arcuately-sheared or lanced lines, as the case may be. Assurance is thus had that the solid center section will be completely severed from the annular section immediately surrounding it, except where a tie-portion, such as illustrated in Fig. 16, connects the two together, or where tie-portions, such as shown in Fig. 19, connect them together; also that complete severance of the metal occurs between the several annular sections of the knock-out and between the outermost annular section and the body of the sheet in which the knock-out is formed.

A die-couple of this kind is illustrated in Fig. 8, in which the various sections of the two members 89 and 90 of the off-setting or bulging dies correspond in number with those shown in Fig. 7 and therefore this off-setting or bulging die-couple is intended for operation on knock-outs stamped, sheared or lanced with die-couples such as shown in Figs. 1, 6, or 7, or any other die-couple usuable for stamping knock-outs. The various sections of this off-setting or bulging die-couple are in all respects similar to the sections of the shearing or lancing die-couples shown in Figs. 6 and 7, except that the outer or operating ends of the sleeve-like or annular sections are formed for off-setting or bulging the metal at the regions engaged thereby, instead of shearing or lancing the metal. The outer operating ends of the die-couple shown in Fig. 8 are therefore designed for supplementary operation on the sheared or lanced knock-outs previously stamped by a shearing or lancing die-couple in the usual manner, with the view of positively separating the metal between sections from tie-portion to tie-portion. The solid center or core section of each member is, however, or may be an exact duplicate of the solid center or core-section of the die-couples shown in Figs. 6 and 7. The thickness of the walls of alternate sleeve-like sections of both members are, however, reduced at their operating or co-acting ends.

The outer or operating end of the outer-most sleeve-like section 91 of the lower-member 90 is rabbeted at its inner peripheral surface, as at 92. The wall of the adjacent sleeve-like section 93 of said die-member is of even thickness from its alining means to its outer or operating end. The section 94 within and adjacent said last-mentioned section 93 is rabbeted at its inner or outer peripheral surface, as at 95, 96, while the remaining sleeve-like section 97 has its wall of even diameter from its alining means to its inner or operating end.

The outermost sleeve-like section 98 of the other or upper member of the off-setting or bulging dies has its wall of even thickness from its alining means to its inner or operating end, which end co-acts with the unrabbeted inner or operating end of the matching section 91. The adjacent sleeve-like section 99 has its inner or operating end rabbeted at both its inner and outer peripheral surfaces, as at 100, 101, for co-action with the unrabbeted inner or operating end of its matching section 93. The next sleeve-like section inwardly, designated 102, has its wall of even diameter from its alining means to its inner or operating end and the latter co-acts with the rabbeted inner or operating end of the matching section 94. The innermost sleeve-like section 103 has its inner or operating end rabbeted at both its inner and outer peripheral surfaces, as at 104, 105, for co-action with the unrabbeted inner end of its matching section 97.

It will thus be seen that the sections of the offsetting or bulging dies are provided with clearance spaces between them at their operating ends, and these clearance spaces are formed by rabbeting the sections at such ends. These sections therefore do not shear the metal but, on the contrary, act to tear or separate any weakened adhering regions along the intended lines of separation which may exist. For this purpose the depressed annular regions between the members of the die-couple are formed deeper than such regions in the shearing or lancing dies, and we find that by forming the inner or operating ends of the several sections, as shown in Figs. 14 and 15 of the drawings, the separation of the sections of the knock-out will be most complete.

As shown in Fig. 14, the two outermost sleeve-like sections of one of the offsetting or bulging die-members are grouped together; the outermost section, for example, 98 of the upper die-member being arranged above the other section 99 and shown axially alined therewith so that it may receive section 99 therein. The inner or operating edges of these sections, as well as any remaining sleeve-like sections forming part of said member, are made undulating to provide high and low points 106, 107, respectively, which may be radially out of line on the two sections, and on any other similar section or sections used to form the assembly of sections in any offsetting or bulging die member to form the knock-out shown in Fig. 16, or which may all be in radial alinement to form a knock-out such as shown in Fig. 19. The co-operating upper die-member has the operating edges of its sections similarly formed so as to match the sections of the lower member. These high and low edge regions are curved gradually into each other so that the sections of the knock-out on which they operate are bulged out of line from between tie-portions, the greatest degree of each bulge being centrally between adjacent tie-portions. This assures a distinct severance of the metal between knock-outs and light can easily be seen along at least the medial region of each arcuately sheared or lanced line.

As previously stated herein, it is necessary to force all portions of a knock-out, after being sheared or lanced, into alinement so that all parts of the knock-out are preferably flat and flush with the sheet, wall or other object in which it is formed, even though under present methods the metal between sections are not completely sheared or lanced. This straightening or alining is of course resorted to after bulging or off-setting the knock-out according to our improved method and this may be accomplished in any well known manner.

In the modification shown in Fig. 9 the same number of sections are employed in the punch-member and the die-member as illustrated in the modification shown in Fig. 6, except that the depressed portions of these members are of varying depths between the nicks employed to form the tie-portions in the knock-out, as indicated by the dotted lines 108, for a purpose to appear hereinafter.

In the modification shown in Fig. 10 both the punch-member and the die-member are made integral, according to the preferred arrangement, the punch-member having annular elevated portions on its operating face, while the die-member has annular depressed portions on its operating face. In this instance the elevated portions of one member are of varying heights, or varying degrees of extension from the true face of the member, and the depressed portions of the other member of varying depths to match said elevated portions, the length of varying regions depending on the spacing between and number of tie-forming nicks employed. In Figs. 9 and 10, the dotted lines 108 and 109 respectively, indicate that each of the knock-outs to be formed by the die-device illustrated will have its section-connecting ties or tie-portions in radial alinement with those of all other sections; while in Fig. 13 the elevated portions of the different annular regions forming the different sections of the knock-out vary in number, due to the fact that the number of tie-forming nicks are gradually increased in number outwardly as the section-forming elements increase in diameter. It will, therefore, be apparent that the principle of forcing certain portions of the annular sections of a knock-out out of alinement to a greater extent than other portions, can be carried out under wide variations of our invention, preferably having the highest portions of the annular regions of one die-member at the nicked points, with the face of these annular regions formed undulating and having their lowest points between the nicked points thereof.

The embodiments of our invention in Figs. 9, 10 and 13 will shear or lance the metal to form the knock-out and simultaneously offset or bulge the sections of the knock-out as hereinbefore described.

It is also to be understood that the tie-forming nicks 44 are preferably formed in the punch-member, as shown in Fig. 11; but if desired may be formed in the die-member. By means of the undulating pressure regions formed on the faces of the two members of the die-couple, certain regions on one annular section of the knock-out such as shown for instance in Figs. 16 and 17, will be forced out of line with adjoining regions so that the sheared or lanced edges around the annular sections and between the tie-portions connecting the annular sections together, or the innermost annular section with the blank or stock in which the knock-out is formed, will be exposed, at least in part. Therefore, when holding the object having the knock-out formed therein in space, light will be seen between sections, thus assuring a complete separation of the sections one from the other, except at the narrow tie-regions or portions.

It is, of course, to be understood that where the bulging or flexing of the annular sections of the knock-out is resorted to, the forming of elevated spaced-apart regions and gradually depressed intervening regions on the operating face of one member of a die-couple calls for a corresponding formation on the other member so that the intervening space between said members is of even height around each annular pressure-exerting region, regardless of the relatively spaced positions of the two members of the punch and die-device.

In the chart shown in Fig. 18, the shearing line between the solid center section or part 46 of the knock-out is represented by the straight line 110. The shearing lines between the annular section 47 immediately surrounding the center section and the section 48 immediately surrounding it, is represented by the curved line 111. The shearing lines between the last-mentioned section 48 and the section 49 immediately surrounding it, is represented by the curved line 112 and the shearing lines between the outermost section 49 and the stock in which the knock-out is formed is represented by the curved line 113. The length of the lines 110, 111, 112 and 113 represent the circumferential dimensions of the lines in the knock-out, while the broken line 114 represents a diametrical line passed through the single tie-portion 50 of the solid center member. The heavy dot 115 through which the line 110 is passed represents the tie-portion 50 connecting the solid center section 46 with the annular section 47 immediately surrounding it. The heavy dots 116 through which the curved line 111 is passed represents the tie-portions 51 between the innermost annular section 47 and the intermediate annular section 48. The heavy dots 117 through which the curved line 112 is passed represents the tie-portions 52 and the intermediate annular section 48 and the outermost annular section 49, and the heavy dots 118 through which the curved line 113 is passed represent the tie-portions 53 between the outermost annular section 49 and the metal or stock in which the knock-out is formed. The spacing of the dots along the curved lines 111, 112 and 113 represent the annular undulating pressure regions of the die-members and the spacing of the tie-portions for each of the annular sections in the knock-out and their relation to the broken line 114 represents their locations with reference to a diametrical line passed through the single tie-portion 50 of the knock-out connecting the solid center section 46 with the annular section 47 immediately surrounding it. The curved lines between dots also represent the arcuate regions sheared between tie-portions and the flexing or bulging of the annular sections along said regions. It is, of course, understood that the solid center section 46 of the knock-out may be deflected out of true alinement with the stock in which the knock-out is formed so that it inclines from its tie-region 50 toward a diametrically opposite point. The operating faces of the members of the punch and die-device may be shaped to maintain the center section of the knock-out in line with the stock in which the knock-out is formed, as illustrated in the sectional view in Fig. 17.

In the chart shown in Fig. 20 each section of the knock-out is represented as connected one with another and the outermost section with the stock in which the knock-out is formed, by three tie-portions. In this figure the broken line 119 represents a diametrical line passed through the knock-out and having tie-portions for all sections along said diametrical lines. In this figure the straight line 120 designates the solid center section 46, the curved line 121 the annular section 47 immediately surrounding said solid center section, the straight line 122 the intermediate annular section 48, and the curved line 123 the outermost annular section 49. In this instance the dots 124 in the straight line 120 represent tie-portions for said solid center section, the dots 125 in the curved line 121 tie-portions connecting the innermost annular section 47 with the intermediate annular section 48, the dots 126 in the straight line 122 tie-portions connecting the intermediate annular section 48 with the outermost annular section 49, and the dots 127 in the curved line 123 represent tie-portions connecting the outermost section 49 with the metal or stock in which the knock-out is formed. The metal or stock in which the knock-out is formed is perfectly flat at the commencement of forming the knock-out and the high and low regions of alternate sections of the punch and die-device, commencing with the innermost, are formed around the annular pressure regions of such sections and operate on the innermost and the outermost annular sections of the knock-out, while the remaining pressure regions of said device are designed to maintain the solid center section of the knock-out and the intermediate annular section of the knock-out in alinement with the stock in which the knock-out is formed. Under this arrangement, the arcuately sheared or lanced portions between sections will also leave light openings, assuring complete severance of the knock-out sections one from another and the outermost section from the metal or stock in which the knock-out is formed.

As hereinbefore set out, all portions of the knock-out flexed or bulged from the true plane of the metal or stock in which it is formed will be forced back into alinement with the stock after the shearing and offsetting or bulging operations are completed, so that the entire knock-out is flush with the stock in which it is formed, yet assurance had that a complete severance of the knock-out from the stock and the sections of the knock-out from each other is had, except at the narrow tie-portions which, as stated, are frail but progressively resistant outwardly so that the center section 46 of the knock-out may be driven from the object in which the knock-out is formed without forcing other portions of the knock-out out of alinement with the metal surrounding the complete knock-out. By so forming the knock-out, the center section thereof may be driven out of the object with any number of the annular sections surrounding it, depending on the size of the opening to be formed in the object, which, of course, is to correspond with the diameter of the conduit to be inserted through the opening.

The punch-holder 25 has fastened into it by any suitable means a centering pin 128 and a similar centering pin 129 co-axial therewith is fastened into the die-holder 26. These pins are adapted to respectively enter holes in the ram and the bed or shoe of a die-set, or the ram and bed of a press. These centering pins are located co-axial with the punch-member and die-member and consequently, a concentric arrangement of the two members of the punch and die-device is assured, even though the guide-posts 27 are removed from the die-mechanism when, for example, knock-outs are to be formed in sheets wider than the space between the guide-posts, or when several knock-outs are to be more closely spaced in a sheet of metal than it would be possible to do when using the guide-posts.

This is especially true in cases where knock-outs are arranged in closely spaced rows and in closely spaced relation in each row, as for example, illustrated in Figs. 21 and 22, wherein a battery of knock-out die-devices are shown. In these figures 130 designates the bed or shoe of a die-set, 131 the ram, and 132 guide posts for guiding the parts of the die-set in their movement relatively, as is common. Where such an arrangement is used, stripper plates without the guide-ears 59 and 61 may be employed. This, however, has not been found necessary due to the fact that these die-mechanisms are very compact and occupy little space compared to mechanisms now used for forming knock-outs, especially multiple or sectional knock-outs, and since in Figs. 21 and 22 the guide-posts 27 are omitted, the stock to be operated upon can be placed between the upper and lower members of any number of punch and die-devices to enable a like number of knock-outs to be formed therein in close proximity to each other and under one operation of the press.

Although, the centering pins 128 and 129 are not shown in Fig. 1, they may, of course, be used in all instances, especially since they provide decided advantages relative to establishing concentricity of parts and so maintaining the same.

It will be apparent from the foregoing that we employ compact main members for our die-devices, whether made integral or in section, such as occupy comparatively little space, and associate therewith simple means for securing such parts in place and for stripping stock from the device or devices when operating, and that such means also occupy comparatively little space; also that the construction is such that a knock-out or knock-outs can be formed in narrow or in wide material and that a large number of knock-outs may be formed in stock in closely spaced relation in one operation.

It is also to be noted that the term "circular" as applied to a part shall be construed broad enough to include an annular part, unless specifically otherwise stated in the appended claims, and that the tie-forming elements 44, in the form of nicks or otherwise, may be formed on or in either member of the die-device, since such means may be formed in the peripheral walls of the elevated portions or in the peripheral walls of the depressed portions of the die-members where they meet the adjacent surface portions of the members.

Manifestly, the number of sections or portions of each member of the punch and die-device may vary, depending on the number of sections or tie-connected parts the knock-outs are to have, and for such variation no departure from our invention is required.

Having thus described our invention what we claim is:

1. A punch and die-device having an integral punch-member and an integral die-member, each member having a die surface and one of said members having a depression in its die surface defined by a surrounding wall forming a shearing edge and the other having a co-acting elevated portion rising from its die surface with a perimetric wall forming a co-acting shearing edge, one of said walls being provided with means at its shearing edge to retain a narrow unsheared region at one point thereof.

2. A punch and die-device, for punching knock-outs in sheet metal and other stock, comprising an integral punch member and an integral die-member, one of said members having a plurality of depressions and the other a plurality of elevations forming co-acting shearing edges to form knock-out sections, one within the other, the shearing edges of one of said members being provided with means to prevent shearing of the stock at points along the lines of shearing.

3. A punch and die-device for punching knock-outs in sheet metal or like stock, comprising an integral punch-member and an integral die-member, one of said members having a plurality of circular depressions and the other a plurality of circular elevations forming co-acting shearing edges to partially shear said stock into a solid central section, said punch and die-members including means to maintain a narrow unsheared tie-portion between said solid central section and the surrounding annular section and to maintain narrow spaced-apart unsheared tie-portions between said annular section and the surrounding stock in which the knock-out is formed.

4. A punch and die-device for punching knock-outs in sheet metal and other stock, comprising an integral punch-member and an integral die-member, each member having a die surface and one of said members having a circular depression on its die surface defined by a circular wall forming a shearing edge and the other having a circular elevated co-acting elevated portion rising from its die surface with a perimetric wall acting as a co-acting shearing edge, one of said walls having a nick at said shearing edge to prevent shearing of the stock at the region of said nick, the confronting faces of said circular depression and said circular elevated portion being inclined from a point in line with said nick toward a point diametrically opposite thereto.

5. A punch and die-device for punching knock-outs in sheet metal or like stock, comprising an integral punch-member and an integral die-member, one of said members having a plurality of circular depressions and the other a plurality of circular elevations forming co-acting shearing edges to partially shear said stock into a solid central section and a plurality of annular sections surrounding one another and all surrounding said solid central section, said punch and die-members including means to maintain a narrow unsheared tie-portion between said solid central section and the annular section immediately surrounding it and narrow unsheared spaced-apart tie-portions between the annular sections and between the outermost annular section and the surrounding portion of the stock in which said sections are formed.

6. Punch and die-mechanism for punching knock-outs in sheet-metal and similar stock, comprising a punch holder and a die-holder, a punch member and a die-member having an outstanding flange at its inner end, a retainer element placed around each of said members and having a rabbeted portion fitting said outstanding flange, means to fasten said retainer elements to said punch and die-holders, stripping plates surrounding said punch and die-members, and springs interposed between said stripping plates and said holders.

7. Punch and die-mechanism for punching knock-outs in sheet metal or similar stock, comprising a punch-holder and a die-holder guided for movement relatively toward and from each other, a cylindrical integral punch-member placed against the face of one of said holders and cylindrical integral die-member placed against the face of the other holder, each of said members having a peripheral flange at its inner end, a retainer annulus engaging each of said flanges and fastened to the adjacent holder to fasten the punch and die-members to said holders, stripping elements surrounding the outer operating ends of said punch and die-members, guide-rods carrying said stripping elements slidable in said holders, and springs surrounding said guide rods between and in contact with said stripping elements and said holders.

8. A punch and die-device for punching knock-outs in sheet-metal and similar stock, comprising a punch-member and a die-member designed for shearing circular regions of varying diameters selectively removable from the stock under force, each of said members having a core portion and a sleeve portion surrounding said core portion, the core portion of each member having its operating end in a different plane than the operating end of its surrounding sleeve portion and the opposite end of said core portion having an outstanding flange, the corresponding end of said sleeve portion having an annular rabbet to receive said flange.

9. A punch and die-device of the kind described, comprising a punch-member and a die-member, each having a cylindrical core element and a plurality of sleeve elements, the core elements and sleeve elements of each member being paired with corresponding elements of the other member, the operating end of one of each pair of sleeve elements being reduced in diameter to provide an annular space between it and a sleeve element surrounding it.

10. A punch and die-device of the kind described comprising a punch-member and a die-member, each having a cylindrical core element and a plurality of sleeve elements, the core elements and sleeve elements of each member being paired with corresponding elements of the other member, the operating end of one of each pair of sleeve elements being reduced in diameter to provide an annular space between it and a sleeve element which surrounds it.

11. A punch and die-device of the kind described comprising a punch-member and a die-member, each having a cylindrical core element and a plurality of sleeve elements, the core elements and sleeve elements of each member being paired with corresponding elements of the other member, the operating end of one of each pair of sleeve elements being reduced in diameter to provide an annular space between it and an element which surrounds it.

12. A punch and die-device of the kind described, comprising a punch-holder and a die-holder, each having centering means co-axially alined, a punch member secured to said punch-holder, and a die-member secured to said die-holder and co-axial with said punch-member, the axes of said punch and die-members being co-axial with said centering means.

13. A punch and die-device of the kind described, comprising a punch-holder and a die-holder, said die holder having a centering pin extending upwardly from its upper face and said die-holder having a centering pin extending downwardly from its lower face, said centering pins being axially alined and adapted to enter fitting holes in the ram and shoe, respective, of a die-set, a punch-member secured to said punch-holder in axial alinement with said centering pins, and a die-member secured to said die-holder in axial alinement with said punch-member.

14. A sectional knock-out formed in sheet metal or other sheet material in box form or otherwise, comprising a plurality of sections arranged in encircling relation and almost completely sheared one from the other and all from the material in which the knock-out is formed by short unsheared regions progressively lengthened between sections from the inner section outwardly.

15. A sectional knock-out formed in sheet metal or other sheet material in box form or otherwise, comprising a plurality of sections, the inner being circular and solid and the remaining sections annular and surrounding one another and all surrounding said inner solid section, said sections being almost sheared one from the other and all from the material in which the knock-out is formed except for short unsheared regions disposed in radial lines and gradually lengthened from the center section outwardly.

16. A punch and die-device for punching knock-outs in sheet metal or like stock, comprising an integral punch-member and an integral die-member, one of said members having a plurality of circular depressions and the other a plurality of circular elevations forming co-acting shearing edges to partially shear said stock into a solid central section and a plurality of annular sections surrounding one another and all surrounding said solid central section, said punch and die-members including means to maintain a narrow unsheared tie-portion between said solid central section and the annular section immediately surrounding it and narrow unsheared spaced-apart tie-portions between the annular sections and between the outermost annular section and the surrounding portion of the stock in which the knock-out is to be formed, said punch and die-members having their opposing faces formed to bulge the sections out of line with each other and the outermost section out of line with the stock in which the knock-out is formed, the bulges being between tie-portions and gradually increasing from tie-portion to points medially disposed relative to said tie-portions.

17. In punch and die-mechanism, a shearing punch and die-device having a punch-member and a die-member with co-acting shearing faces for shearing or lancing sectional knock-outs in which the sections are sheared or lanced one from the other with narrow tie-portions connecting the sections together and the outer section with the stock in which the knock-out is formed, and a bulging punch and die-device having non-shearing undulating cooperating faces acting upon the sheared or lanced sections of the knock-out to bulge or off-set portions of said sections with respect to adjoining sections and to the stock in which the knock-out is formed so that light can be seen through the sheared or lanced lines formed by the first-mentioned die-device.

18. In punch and die-mechanism, a punch and die-device having a punch-member and a die-member with co-acting shearing faces for shearing or lancing sectional knock-outs in which the sections are formed circularly and sheared or lanced one from the other with narrow tie-portions connecting adjoining sections together and the outer section with the stock in which the knock-out is formed, and a bulging punch and die device having non-shearing co-operating faces acting upon the circularly-sheared sections and having co-acting high and low portions to bulge a circularly-sheared or lanced section out of line with an adjoining section with the stock in which the knock-out is formed, the greatest degree of bulging so formed being medially between the tie-portions connecting such section with an adjoining section or with the stock in which the knock-out is formed.

19. The method of forming sectional knock-outs in which one section surrounds another, which comprises shearing or lancing stock circularly and retaining connection between sections and between the outer section and the stock by narrow unsheared or unlanced tie-portions, and in applying force to the sections between the tie-portions thereof to bulge said sections with the greatest degree of bulge medially between tie-portions.

20. The method of forming sectional knock-outs having a solid center section and one or more annular sections surrounding the solid center section, comprising the shearing or lancing of the stock circularly while retaining at least a tie-portion between said solid center section and the annular section immediately surrounding it and maintaining narrow unsheared or unlanced tie-portions between annular sections and between the outermost annular section and the stock in which the knock-out is formed, and in bulging the annular sections between their tie-portions to assure complete severance of the stock along the sheared or lanced lines from tie-portion to tie-portion.

21. The method of forming sectional knock-outs having a solid center section and a plurality of annular sections surrounding one another and all surrounding said solid center section, comprising the shearing or lancing of stock between sections and between the outermost section and the stock while maintaining narrow tie-portions between sections capable of being broken under force, and while so shearing or lancing the stock to form said sections, bulging or deflecting the sections between tie-portions with the greatest degree of deflection medially between tie-portions connecting each section to an adjoining section and connecting the outermost section to the stock in which the knock-out is formed, thereby assuring complete severance of the stock along the lanced or sheared lines except where the tie-portions are formed which connect said sections together and the outermost section to the stock.

22. The method of forming sectional knock-outs, which comprise the utilization of dies having circular pressure regions, the faces of which are at varying elevations, in therewith applying pressure to a rudimentarily-formed sectional knock-out in which the sections are connected together with narrow tie-portions and thus cause the sections to be bulged between tie-portions so as to assure complete severance of one section from the other from tie-portion to tie-portion.

LAWRENCE V. WHISTLER.
SANFORD A. WHISTLER.